United States Patent
Hongou (10) Patent No.: US 9,553,684 B2
(45) Date of Patent: Jan. 24, 2017

(54) DATA FRAME GENERATION CIRCUIT AND DATA FRAME GENERATION METHOD

(71) Applicant: FUJITSU LIMITED, Kawasaki-shi, Kanagawa (JP)

(72) Inventor: Hironobu Hongou, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 241 days.

(21) Appl. No.: 14/056,507

(22) Filed: Oct. 17, 2013

(65) Prior Publication Data
US 2014/0205299 A1    Jul. 24, 2014

(30) Foreign Application Priority Data
Jan. 24, 2013   (JP) .................. 2013-010847

(51) Int. Cl.
*H04J 3/06*    (2006.01)
*H04J 3/16*    (2006.01)

(52) U.S. Cl.
CPC ............ *H04J 3/0691* (2013.01); *H04J 3/1652* (2013.01)

(58) Field of Classification Search
None
See application file for complete search history.

(56) References Cited

U.S. PATENT DOCUMENTS

2002/0037065 A1 *  3/2002  Nakamura ................. 375/375
2008/0145065 A1 *  6/2008  Kawamura et al. ........ 398/182

FOREIGN PATENT DOCUMENTS

JP    7-235904    9/1995

* cited by examiner

*Primary Examiner* — Hassan Phillips
*Assistant Examiner* — Omeed D Rahgozar
(74) *Attorney, Agent, or Firm* — Staas & Halsey LLP (57) ABSTRACT

A data frame generation circuit, includes: a frame generation unit configured to output a first data frame including client signals and a first signal count of the client signals included in the first data frame, the client signal being stored in the first data frame in accordance with a system clock; a storage unit configured to store a signal count range; a comparison unit configured to compare the first signal count to the signal count range; and a control unit configured to control a frequency of the system clock based on a comparison result, wherein, if the first signal count falls within the signal count range, the control unit changes the frequency of the system clock.

15 Claims, 10 Drawing Sheets

DATA FRAME GENERATION CIRCUIT AND DATA FRAME GENERATION METHOD

CROSS-REFERENCE TO RELATED APPLICATION

This application is based upon and claims the benefit of priority of the prior Japanese Patent Application No. 2013-010847, filed on Jan. 24, 2013, the entire contents of which are incorporated herein by reference.

FIELD

Embodiments discussed herein are related to data frame generation circuits and data frame generation methods.

BACKGROUND

Among optical transmission apparatuses, there exists an optical transmission apparatus that converts a wireless signal to an optical signal and transmits the optical signal.

Related techniques are disclosed in Japanese Laid-open Patent Publication No. 7-235904.

SUMMARY

According to one aspect of the embodiments, a data frame generation circuit, includes: a frame generation unit configured to output a first data frame including client signals and a first signal count of the client signals included in the first data frame, the client signal being stored in the first data frame in accordance with a system clock; a storage unit configured to store a signal count range; a comparison unit configured to compare the first signal count to the signal count range; and a control unit configured to control a frequency of the system clock based on a comparison result, wherein, if the first signal count falls within the signal count range, the control unit changes the frequency of the system clock.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An optical transmission apparatus converts a wireless signal to an optical signal and transmits the optical signal. In such an optical transmission apparatus, the emission wavelength is controlled in accordance with a beat noise level of the optical signal to be transmitted, which is measured in each device that converts a wireless signal to an optical signal, and thus beat noise is suppressed.

Optical transmission techniques include an optical transport network (OTN). The OTN is an optical transport network that is defined by the International Telecommunication Union-Telecommunication Standardization Sector (ITU-T) recommendation G.709.

In optical transport networks such as the OTN, a time division multiplex conversion device of a pulse stuffing system may be used. A stuffing pulse (extra pulse) is inserted into a low order group pulse code modulation (PCM) signal that is stored in a data frame. As a stuffing pulse is inserted, a plurality of low order group PCM signals having different transmission rates may be synchronized.

A data transmitting side device adjusts a frequency at which the stuffing pulses are inserted into the respective low order group PCM signals, thereby synchronizing the plurality of low order group PCM signals having different transmission rates and transmitting the data, which has been multiplexed, to a receiving side. The data transmitting side device transmits information on the stuffing pulses to the receiving side. The data receiving side device reproduces the original PCM signals by removing the stuffing pulses when separating the multiplexed data.

In the transmitting side device, the number of low order group PCM signals stored in each data frame is determined based on a frequency deviation of low order group PCM signals that are inputted to a circuit for generating data frames and a frequency deviation of system clocks that are inputted to the circuit for generating the data frames. For example, the number of low order group PCM signals stored in each data frame is not fixed and may vary.

The data receiving side device reproduces clock signals through, for example, a phase locked loop (PLL) based on the number of the PCM signals stored in each data frame. Thus, if the number of low order group PCM signals stored in each data frame varies when the data frames are generated in the data transmitting side device, noise such as jitter and beats may occur in the data receiving side device. Such noise may degrade the purity of the clock signals reproduced from the received signals.

In the standards for the optical transport network in the ITU-T, noise may occur at an offset frequency of 10 KHz or higher. By setting a cutoff frequency in the PLL to approximately a few Hz, noise at an offset frequency of 10 KHz or higher may be removed. Thus, in the optical transport network, the data receiving side device may be able to reproduce clock signals with little jitter.

A base station for a portable telephone system that uses the optical transport network may use the clock signals reproduced from the data through the PLL as reference signals for a microwave local oscillator. Occurrence of noise at an offset frequency of 1 KHz or lower may degrade the purity of the clock signals.

In the optical transport network, although noise at an offset frequency of 10 KHz or higher is removed, noise at an offset frequency of approximately 1 KHz or lower may not be removed. For example, in the optical transport network, if the number of low order group PCM signals stored in each data frame varies at a rate of once in one million times, low frequency beat noise that corresponds to that rate of once in one million times may occur. Such low frequency beat noise passes through the optical transport network without being attenuated by an optical transmission apparatus such as an optical relay device provided in the optical transport network. Thus, in the base station for the portable telephone system that receives data through the optical transport network, clock signals may not be reproduced with high purity due to an influence of low frequency beat noise.

In the drawings described hereinafter, similar constituent elements are given identical reference characters, and descriptions thereof may be omitted or reduced.

Figure 1:
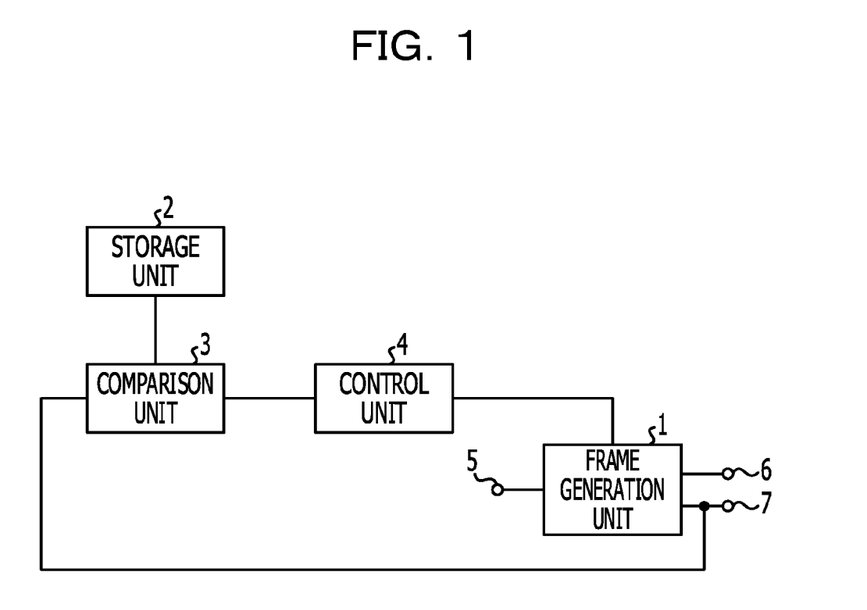
FIG. 1 illustrates an example of a data frame generation circuit.
Figure 2:
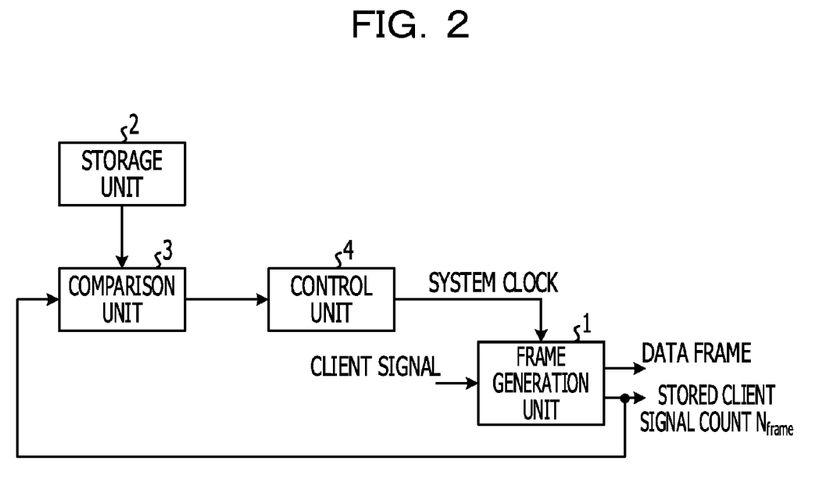
FIG. 2 illustrates an example of a signal flow in a data frame generation circuit.

FIG. 1 illustrates an example of a data frame generation circuit. FIG. 2 illustrates an example of signal flow in a data frame generation circuit. In FIG. 2, signal flow in the data frame generation circuit illustrated in FIG. 1 is illustrated. The data frame generation circuit includes a frame generation unit 1, a storage unit 2, a comparison unit 3, and a control unit 4.

The frame generation unit 1 is coupled to the control unit 4, a client signal input terminal 5, a data frame output terminal 6, and a stored client signal count (designated as $N_{frame}$) output terminal 7. The client signal input terminal 5 may be coupled, for example, to a reception processing unit disposed at a stage preceding the data frame generation circuit. A client signal may be input to the client signal input terminal 5 from, for example, the reception processing unit disposed at a stage preceding the data frame generation circuit.

The frame generation unit 1 stores, in a data frame, client signals, which are input through the client signal input terminal 5, in accordance with a system clock output from the control unit 4, and outputs the data frame, in which the client signals have been stored, to the data frame output terminal 6. The data frame output terminal 6 may be coupled, for example, to a transmission processing unit disposed at a stage following the data frame generation circuit.

The frame generation unit 1 outputs a storage count $N_{frame}$ of the client signals stored in the data frame to the stored client signal count $N_{frame}$ output terminal 7 on a data frame by data frame basis. The stored client signal count $N_{frame}$ output terminal 7 may be coupled, for example, to the transmission processing unit disposed at a stage following the data frame generation circuit. The stored client signal count $N_{frame}$ output terminal 7 is coupled to an input port of the comparison unit 3.

The comparison unit 3 is coupled to the stored client signal count $N_{frame}$ output terminal 7 and the storage unit 2. The storage unit 2 stores a signal count range. The signal count range indicates the range of client signal counts that may generate beat noise. Thus, beat noise may occur if the stored client signal count $N_{frame}$ in a data frame falls within the signal count range that may generate beat noise. Beat noise may not occur if the stored client signal count $N_{frame}$ in a data frame does not fall within the signal count range that may generate beat noise.

The comparison unit 3 compares the stored client signal count $N_{frame}$ output from the frame generation unit 1 with the signal count range that may generate beat noise, which is stored in the storage unit 2.

The control unit 4 is coupled to the comparison unit 3 and the frame generation unit 1. The control unit 4 supplies the system clock to the frame generation unit 1. The control unit 4 controls the frequency of the system clock based on a comparison result of the comparison unit 3. For example, if the stored client signal count $N_{frame}$ falls within the signal count range that may generate beat noise, the control unit 4 may modify the frequency of the system clock so that the stored client signal count $N_{frame}$ falls outside the signal count range that may generate beat noise.

A system clock may be supplied to the frame generation unit 1 from a processing block distinct from the control unit 4. The control unit 4 may modify the frequency of the system clock that is supplied to the frame generation unit 1 from the processing block distinct from the control unit 4.

In the data frame generation circuit illustrated in FIG. 1, each of the frame generation unit 1, the storage unit 2, the comparison unit 3, and the control unit 4 may be realized by hardware. Alternatively, the frame generation unit 1, the comparison unit 3, and the control unit 4 may be realized through software processing.

Figure 3:
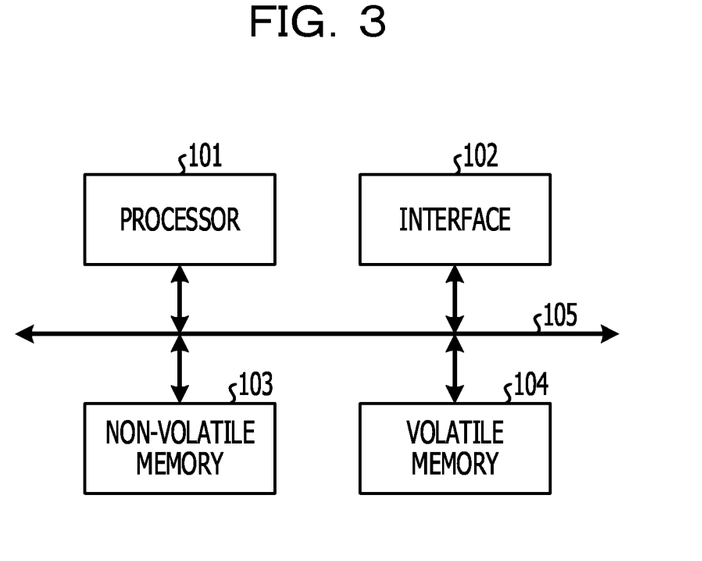
FIG. 3 illustrates an example of a hardware configuration of a data frame generation circuit.

FIG. 3 illustrates an example of a hardware configuration of a data frame generation circuit. The data frame generation circuit illustrated in FIG. 3 may be the data frame generation circuit illustrated in FIG. 1. As illustrated in FIG. 3, the data frame generation circuit includes, for example, a processor 101, an interface 102, a non-volatile memory 103, and a volatile memory 104. The processor 101, the interface 102, the non-volatile memory 103, and the volatile memory 104 may be coupled to a bus 105.

The processor 101 executes a program for generating a data frame. The frame generation unit 1, the comparison unit 3, and the control unit 4 of the data frame generation circuit illustrated in FIG. 1 are realized. The processor 101 may, for example, be a central processing unit (CPU), a digital signal processor (DSP), an application specific integrated circuit (ASIC), or a programmable logic device such as a field programmable gate array (FPGA).

The non-volatile memory 103 stores a boot program and a program for generating a data frame. The non-volatile memory 103 stores the aforementioned signal count range. If the processor 101 is a programmable logic device, the non-volatile memory 103 may store circuit information of the programmable logic device. The non-volatile memory 103 may be a read only memory (ROM) such as a mask ROM, an electrically erasable programmable read only memory (EEPROM), or a flash memory.

The volatile memory 104 is used as a work area for the processor 101. The volatile memory 104 retains the programs, the signal count range, and the circuit information that have been loaded from the non-volatile memory 103. The volatile memory 104 may be a random access memory (RAM) such as a dynamic random access memory (DRAM) and a static random access memory (SRAM). For example, the non-volatile memory 103 and the volatile memory 104 may correspond to the storage unit 2 of the data frame generation circuit illustrated in FIG. 1.

The interface 102 accepts input of client signals and outputs data frames and the stored client signal count $N_{frame}$.

Figure 4:
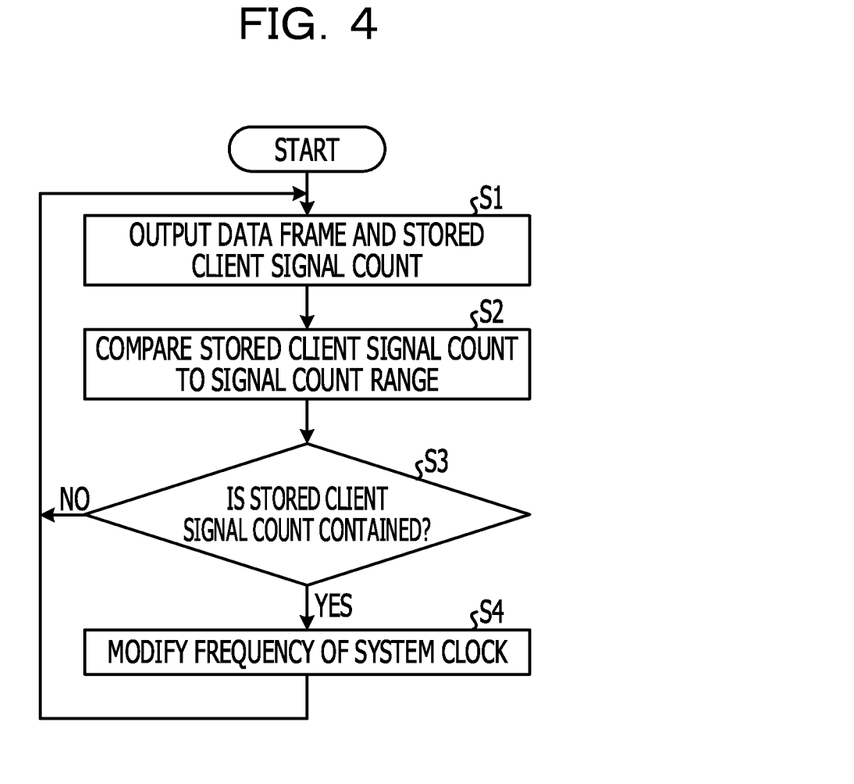
FIG. 4 illustrates an example of a data frame generation method.

FIG. 4 illustrates an example of a data frame generation method. The data frame generation method illustrated in FIG. 4 may be implemented in the data frame generation circuit illustrated in FIG. 1.

Upon the start of the data frame generation method, the frame generation unit 1 generates a data frame in which client signals have been stored in accordance with the system clock and outputs the data frame. In addition, the frame generation unit 1 outputs the stored client signal count $N_{frame}$ in the data frame on a data frame by data frame basis (operation S1).

The comparison unit 3 compares the stored client signal count $N_{frame}$ outputted from the frame generation unit 1 with the signal count range that may generate beat noise, which is stored in the storage unit 2 (operation S2). If the comparison result indicates that the stored client signal count $N_{frame}$ in the data frame falls within the signal count range that may generate beat noise (operation S3: Yes), the control unit 4 modifies the frequency of the system clock supplied to the frame generation unit 1 (operation S4).

The control unit 4 modifies the frequency of the system clock such that the stored client signal count $N_{frame}$ in the data frame falls outside the signal count range that may generate beat noise. The processing then returns to operation S1, and operation S1 to operation S4 are repeated until the device that includes the data frame generation circuit finishes generating and outputting the data frames.

If the comparison result of the comparison unit 3 indicates that the stored client signal count $N_{frame}$ in the data frame does not fall within the signal count range that may generate beat noise (operation S3: No), the control unit 4 refrains from modifying the frequency of the system clock, and the processing returns to operation S1.

The frequency of the system clock is controlled such that the stored client signal count $N_{frame}$ in the data frame falls outside the signal count range that may generate beat noise. Thus, the client signals may be stored in each data frame such that low frequency beat noise does not occur.

Occurrence of low frequency beat noise may be suppressed in data transmission that uses the optical transport network. As low frequency beat noise is suppressed in the optical transport network, clock signals may be reproduced with high purity without being affected by low frequency beat noise in the base station for the portable telephone system to which the data is transferred through the optical transport network.

The data frame generation circuit illustrated in FIG. 1 may be applied to an optical transmission apparatus that is used in the OTN defined, for example, through the ITU-T recommendation G.709.

Figure 5:
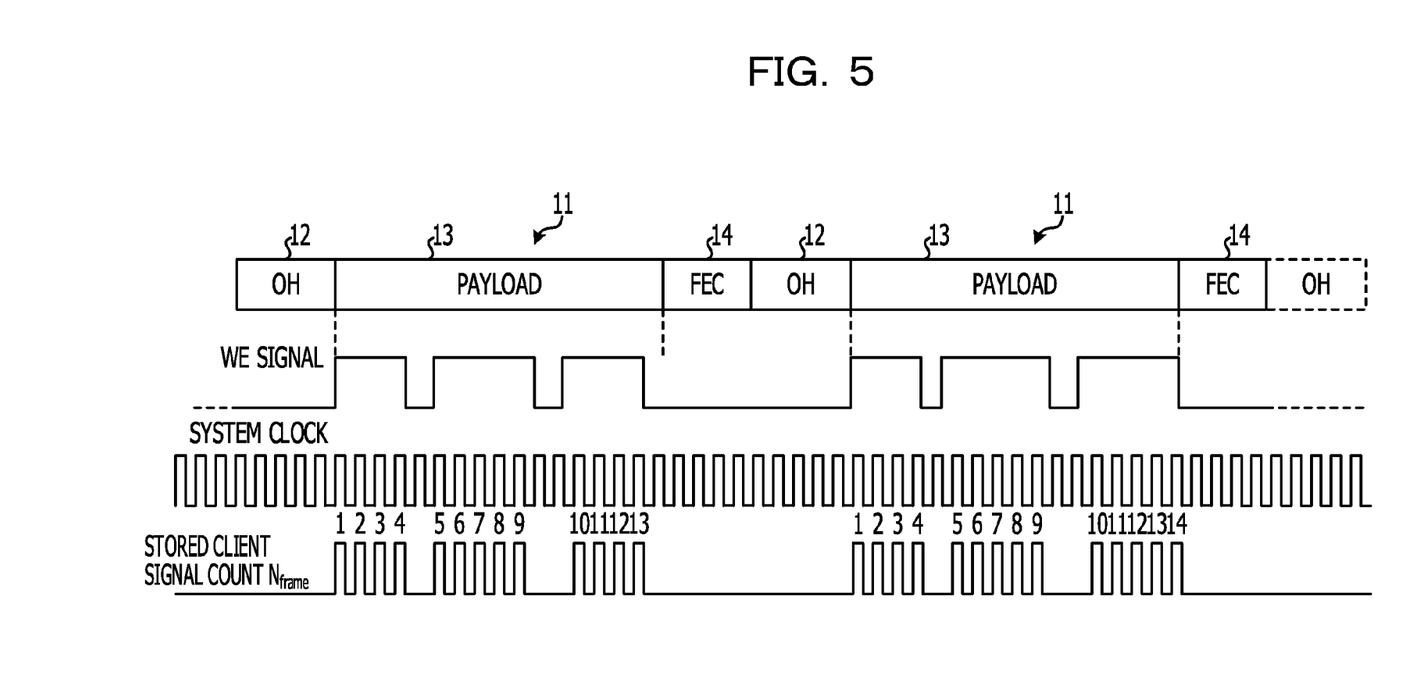
FIG. 5 illustrates an example of an OTN data frame.

FIG. 5 illustrates an example of an OTN data frame. As illustrated in FIG. 5, each data frame 11 includes an overhead (OH) unit 12, a payload unit 13, and a forward error correction (FEC) unit 14. Frame information is stored in the overhead unit 12. Information on low order group PCM signals is stored in the payload unit 13. Error correction information is stored in the forward error correction unit 14.

Client data stored in the payload unit 13 is indicated by a write enable (WE) signal. The number of low order group PCM signals stored in the payload unit 13 may be determined based on a logical product of the write enable signal and the system clock. The stored client signal count $N_{frame}$ in the data frame 11 may be determined based on the number of low order group PCM signals stored in the payload unit 13.

The number of low order group PCM signals stored in the payload unit 13 may be referred to as a "stored low order group PCM signal count in a frame". $N_{frame}$ may represent the stored low order group PCM signal count in a frame.

For example, in FIG. 5, the stored low order group PCM signal count in a frame $N_{frame}$ may be 13 in the first frame and may be 14 in a subsequent frame. The stored low order group PCM signal count in a frame $N_{frame}$ may range from approximately a few thousands to a few tens of thousands. Hereinafter, the stored low order group PCM signal count in a frame $N_{frame}$ may be approximately 14.

The data frames 11 are repeated in cycles of, for example, 100 μs. The stored low order group PCM signal count in a frame $N_{frame}$ is determined based on the frequency deviation of client signals serving as input signals and the frequency deviation of the system clock for generating the data frame 11. Thus, the stored low order group PCM signal count in a frame $N_{frame}$ changes its value, for example, every 100 μs.

The stored low order group PCM signal count in a frame $N_{frame}$ in each of the data frames 11 is an integer. A long term mean value of the stored low order group PCM signal counts in frames $N_{frame}$ may, for example, include a value with a decimal point, such as 13.5. For example, if the data frames 11 each having a stored low order group PCM signal count in a frame $N_{frame}$ of 13 appear at substantially the same rate as the data frames 11 each having a stored low order group PCM signal count in a frame $N_{frame}$ of 14, the mean value of the stored low order group PCM signal counts in frames $N_{frame}$ may be 13.5.

Figure 6:
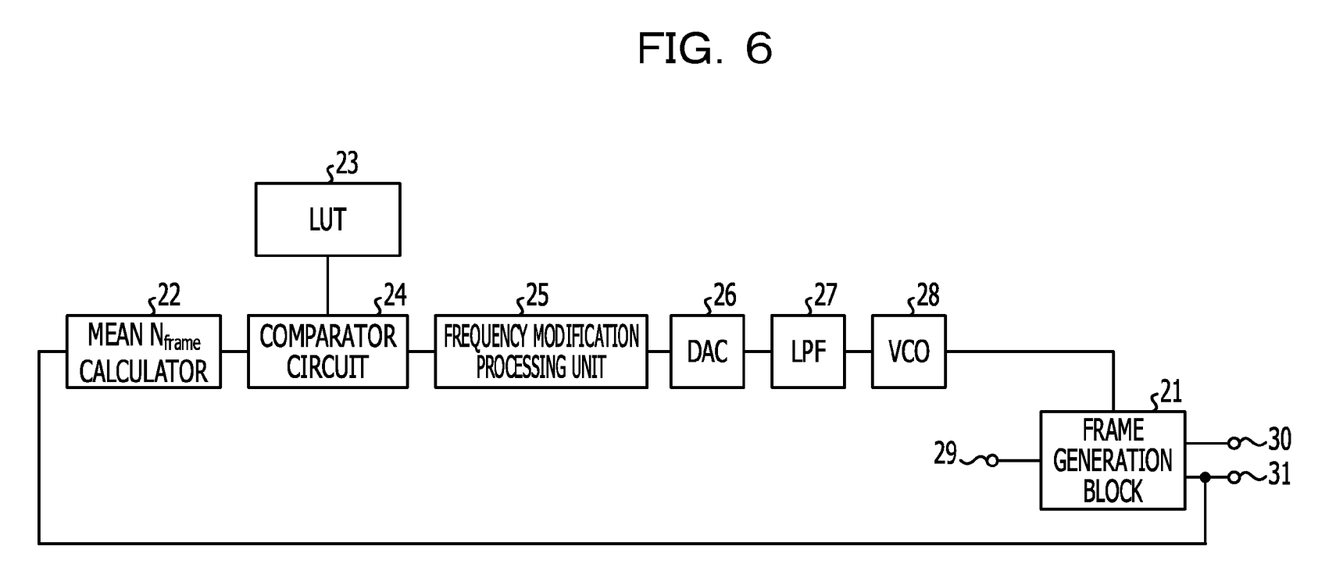
FIG. 6 illustrates an example of a data frame generation circuit.
Figure 7:
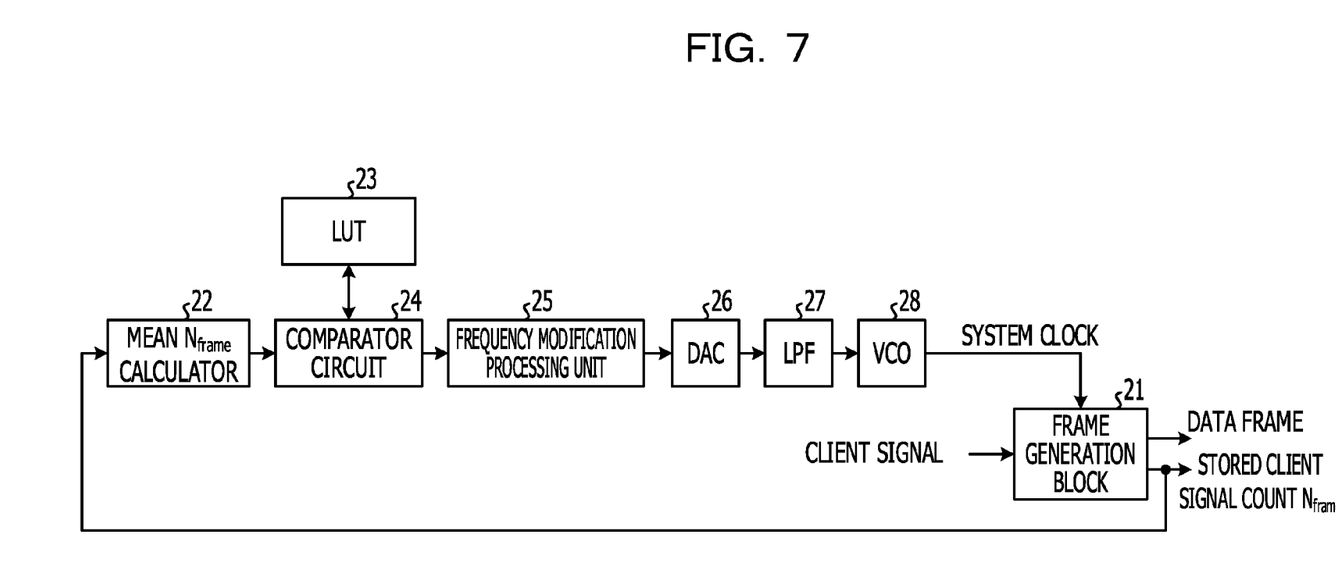
FIG. 7 is a diagram illustrating an example of signal flow in a data frame generation circuit.

FIG. 6 illustrates an example of a data frame generation circuit. FIG. 7 illustrates an example of signal flow in a data frame generation circuit. The data frame generation circuit includes a frame generation block 21, a mean $N_{frame}$ calculator 22, a lookup table (LUT) 23, and a comparator circuit 24. The frame generation block 21 may correspond to a frame generation unit. The mean $N_{frame}$ calculator 22 and the comparator circuit 24 may correctively correspond to a comparison unit. The lookup table 23 may correspond to a storage unit.

The data frame generation circuit further includes a frequency modification processing unit 25, a digital to analog converter (DAC) 26, a low pass filter (LPF) 27, and a voltage controlled oscillator (VCO) 28. The frequency modification processing unit 25, the digital to analog converter 26, the low pass filter 27, and the voltage controlled oscillator 28 may correspond to a control unit.

The frame generation block 21 is coupled to an output port of the voltage controlled oscillator 28, a client signal input terminal 29, a data frame output terminal 30, and a stored low order group PCM signal count in a frame $N_{frame}$ output terminal 31. The client signal input terminal 29 may be coupled, for example, to a reception processing unit disposed at a stage preceding the data frame generation circuit. A client signal is input to the client signal input terminal 29 from, for example, the reception processing unit disposed at a stage preceding the data frame generation circuit.

Client signals input through the client signal input terminal 29 are stored, for example, in a data frame, as illustrated in FIG. 5, in accordance with the system clock output from the voltage controlled oscillator 28, and thus the frame generation block 21 generates the data frame that includes the low order group PCM signals. The frame generation block 21 outputs the generated data frame to the data frame output terminal 30. The data frame output terminal 30 may be coupled, for example, to a transmission processing unit disposed at a stage following the data frame generation circuit.

The frame generation block 21 outputs the stored low order group PCM signal count in a frame $N_{frame}$ to the stored low order group PCM signal count in a frame $N_{frame}$ output terminal 31 on a data frame by data frame basis. The stored low order group PCM signal count in a frame $N_{frame}$ terminal 31 frame output may be coupled to the transmission processing unit disposed at a stage following the data frame generation circuit. The stored low order group PCM signal count in a frame $N_{frame}$ output terminal 31 is coupled to an input port of the mean $N_{frame}$ calculator 22.

The mean $N_{frame}$ calculator 22 is coupled to the stored low order group PCM signal count in a frame $N_{frame}$ output terminal 31. The mean $N_{frame}$ calculator 22 calculates a mean value, per unit time, of the stored low order group PCM signal counts in frames $N_{frame}$ output from the frame generation block 21. The mean $N_{frame}$ calculator 22 outputs the calculated mean value of the stored low order group PCM signal counts in frames $N_{frame}$.

The comparator circuit 24 is coupled to the mean $N_{frame}$ calculator 22 and the lookup table 23. A mean value range for the stored low order group PCM signal count in a frame $N_{frame}$ that may generate beat noise is recorded in the lookup table 23.

If the stored low order group PCM signal count in a frame $N_{frame}$ in the data frame falls within the mean value range for the stored low order group PCM signal count in a frame $N_{frame}$ that may generate beat noise, beat noise may occur. If the stored low order group PCM signal count in a frame $N_{frame}$ in the data frame does not fall within the mean value range for the stored low order group PCM signal count in a frame $N_{frame}$ that may generate beat noise, beat noise may not occur.

The comparator circuit 24 compares the mean value of the stored low order group PCM signal counts in frames $N_{frame}$, which has been output from the mean $N_{frame}$ calculator 22, with the mean value range for the stored low order group PCM signal count in a frame $N_{frame}$ that may generate beat noise, which is recorded in the lookup table 23. If the mean value of the stored low order group PCM signal counts in frames $N_{frame}$ falls within the mean value range for the stored low order group PCM signal count in a frame $N_{frame}$ that my generate beat noise, the comparator circuit 24 outputs a match signal.

If the mean value of the stored low order group PCM signal counts in frames $N_{frame}$ does not fall within the mean value range for the stored low order group PCM signal count in a frame $N_{frame}$ that may generate beat noise, the comparator circuit 24 outputs a mismatch signal. For example, the match signal may be "1", and the mismatch signal may be "0".

The frequency modification processing unit 25 is coupled to the comparator circuit 24. Upon a match signal being input from the comparator circuit 24, the frequency modification processing unit 25 operates so as to change an output voltage of the digital to analog converter 26. Upon a mismatch signal being input from the comparator circuit 24, the frequency modification processing unit 25 may refrain from acting on the digital to analog converter 26.

The digital to analog converter 26 is coupled to the frequency modification processing unit 25. If the frequency modification processing unit 25 operates so as to change the output voltage of the digital to analog converter 26, the output voltage of the digital to analog converter 26 changes. If the frequency modification processing unit 25 refrains from acting on the digital to analog converter 26, the output voltage of the digital to analog converter 26 does not change.

The low pass filter 27 is coupled to the digital to analog converter 26. The output voltage of the digital to analog converter 26 is converted to a direct current voltage by passing through the low pass filter 27. The frequency modification processing unit 25 operates to change the output voltage of the digital to analog converter 26. Thus, when the output voltage of the digital to analog converter 26 changes, the output voltage of the digital to analog converter 26 changes gradually by passing through the low pass filter 27.

The voltage controlled oscillator 28 is coupled to the low pass filter 27 and a system clock input terminal of the frame generation block 21. The voltage controlled oscillator 28 oscillates at a frequency in accordance with the output voltage from the low pass filter 27 and supplies, to the frame generation block 21, a system clock having a frequency in accordance with the output voltage from the low pass filter 27.

In the data frame generation circuit illustrated in FIG. 6, the frame generation block 21, the mean $N_{frame}$ calculator 22, the lookup table 23, the comparator circuit 24, and the frequency modification processing unit 25 may each be hardware. Processes of the frame generation block 21, the mean $N_{frame}$ calculator 22, the comparator circuit 24, and the frequency modification processing unit 25 may be carried out by software.

The processes of the frame generation block 21, the mean $N_{frame}$ calculator 22, the comparator circuit 24, and the frequency modification processing unit 25 may be carried out by software in the data frame generation circuit illustrated in FIG. 3. The processor 101 illustrated in FIG. 3 executes a program that corresponds to the data frame generation method described above. The lookup table 23 may correspond to the non-volatile memory 103 and the volatile memory 104 illustrated in FIG. 3.

Figure 8:
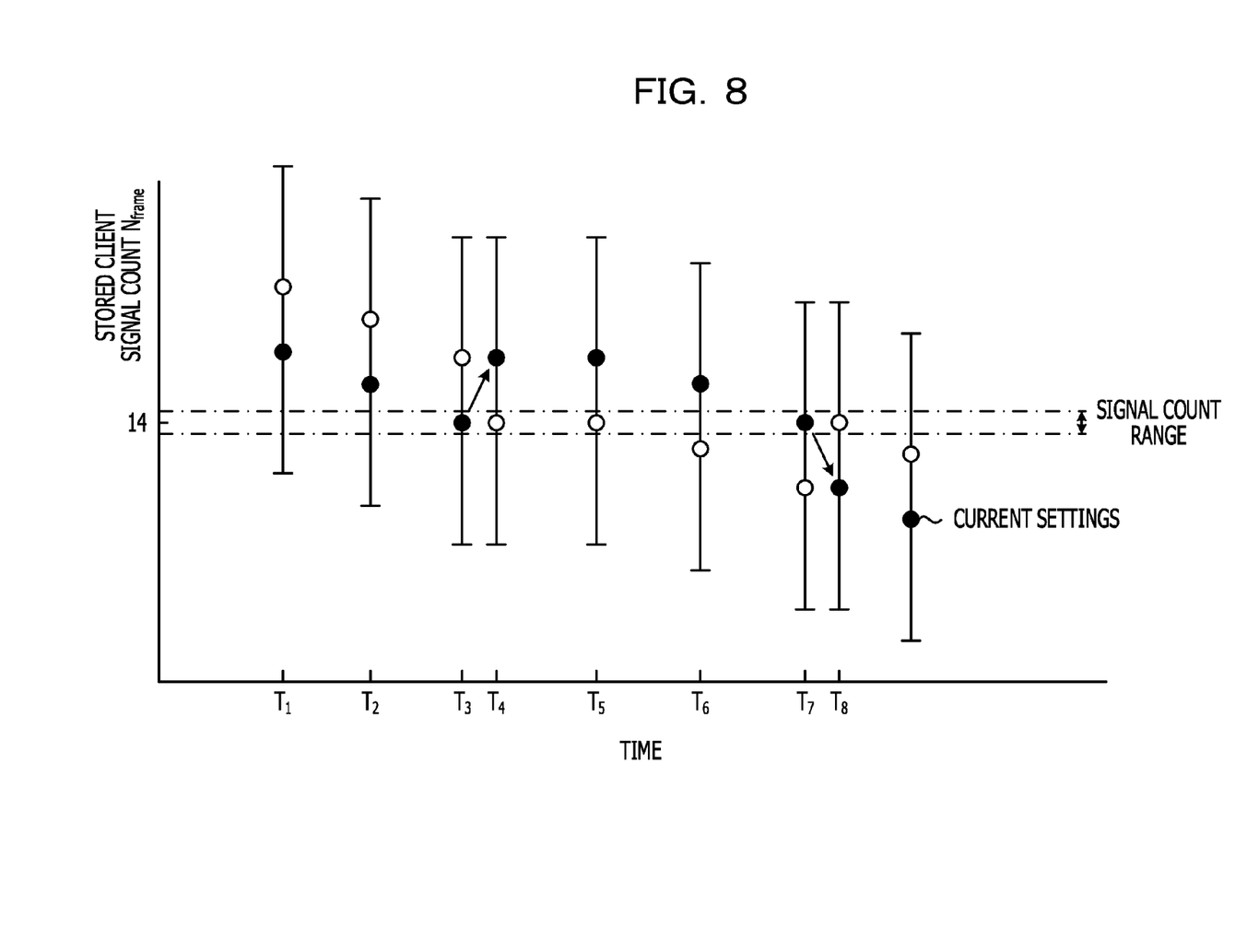
FIG. 8 illustrates an example of an operation of a frequency modification processing unit.

FIG. 8 illustrates an example of operation of the frequency modification processing unit. FIG. 8 may illustrate the operation of the frequency modification processing unit of the data frame generation circuit illustrated in FIG. 7. In FIG. 8, the vertical axis indicates the stored low order group PCM signal count in a frame $N_{frame}$, and the horizontal axis indicates the time. In FIG. 8, as in FIG. 5, the stored low order group PCM signal count in a frame $N_{frame}$ may, for example, be approximately 14.

Filled circles in FIG. 8 indicate current settings for the stored low order group PCM signal count in a frame $N_{frame}$. Open circles indicate potential modification settings for the stored low order group PCM signal count in a frame $N_{frame}$ at respective times.

Line segments that each pass through a filled circle and an open circle and extend perpendicularly to the time axis indicate ranges in which the stored low order group PCM signal count in a frame $N_{frame}$ can vary through the control of the system clock of the voltage controlled oscillator 28. A region defined by two dash-dotted lines that extend parallel to the time axis may indicate the signal count range, for example, the mean value range for the stored low order group PCM signal count in a frame $N_{frame}$ that may generate beat noise.

The frequency modification processing unit 25 configures potential modification setting based on the current setting, at the respective times, for the stored low order group PCM signal count in a frame $N_{frame}$. The difference between the current setting and the potential modification setting for the stored low order group PCM signal count in a frame $N_{frame}$ at the respective times is set to become greater than the difference between an upper limit and a lower limit of the mean value range for the stored low order group PCM signal count in a frame $N_{frame}$ that may generate beat noise.

Thus, the current setting and the potential modification setting for the stored low order group PCM signal count in a frame $N_{frame}$ may fall within simultaneously the mean value range for the stored low order group PCM signal count in a frame $N_{frame}$ that may generate beat noise. If the current settings for the stored low order group PCM signal count in a frame $N_{frame}$ falls within the mean value range for the stored low order group PCM signal count in a frame $N_{frame}$ that may generate beat noise, shifting from the current settings to the potential modification settings may suppress occurrence of beat noise.

When a match signal is input from the comparator circuit 24, the frequency modification processing unit 25 modifies the oscillation frequency of the voltage controlled oscillator 28 such that the setting for the stored low order group PCM signal count in a frame $N_{frame}$ shifts from the current settings to the potential modification settings. For example, in FIG. 8, as the time progresses from a time $T_1$, a time $T_2$, to a time $T_3$, the current settings for the stored low order group PCM signal count in a frame $N_{frame}$ approach 14.

At the time $T_3$, the current setting for the stored low order group PCM signal count in a frame $N_{frame}$ falls within the mean value range for the stored low order group PCM signal count in a frame $N_{frame}$ that may generate beat noise. Thus, at a time $T_4$, the current setting for the stored low order group PCM signal count in a frame $N_{frame}$ shifts to the settings that have been the potential modification settings at the time $T_3$, as indicated by an arrow in FIG. 8. At the time $T_4$, the setting that has been the current setting at the time $T_3$ is the potential setting.

As the time progresses from a time $T_5$, a time $T_6$, to a time $T_7$, the current setting for the stored low order group PCM signal count in a frame $N_{frame}$ approaches 14. Between the time $T_7$ and a time $T_8$, similarly to the time $T_3$ and the time $T_4$, the current setting for the stored low order group PCM signal count in a frame $N_{frame}$ shifts.

The frequency modification processing unit 25 changes the output voltage of the digital to analog converter 26 such that the setting for the stored low order group PCM signal count in a frame $N_{frame}$ shifts as described above. When the variation range of the frequencies of the voltage controlled oscillator 28 is represented by $\Delta f$ and the modulation sensitivity of the voltage controlled oscillator 28 is represented by $K_v$ [ppm/V], a variation amount $\Delta V_{dac}$ [V] of the output voltage of the digital to analog converter 26 is expressed through the following expression.

$$\Delta V_{dac} = \Delta f / K_v$$

As long as the oscillation frequency of the voltage controlled oscillator 28 is controlled such that the current setting for the stored low order group PCM signal count in a frame $N_{frame}$ does not fall within the mean value range for the stored low order group PCM signal count in a frame $N_{frame}$ that may generate beat noise, any desired control method can be employed.

Figure 9:
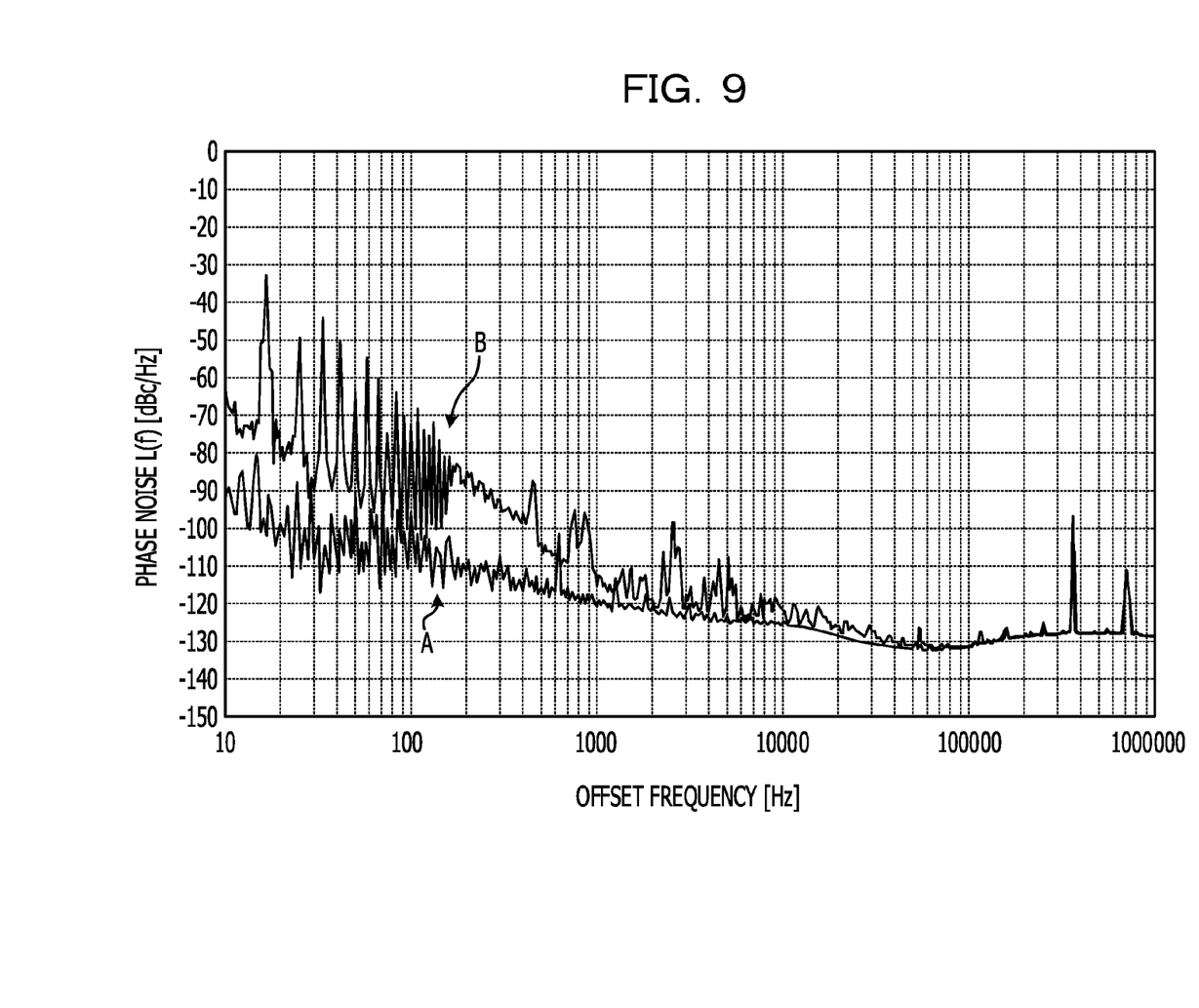
FIG. 9 illustrates an example of a measurement result of phase noise.

FIG. 9 illustrates an example of a measurement result of phase noise. In FIG. 9, the vertical axis indicates phase noise L(f) [dBc/Hz], and the horizontal axis indicates the offset frequency [Hz]. In FIG. 9, A indicates the frequency characteristics of phase noise that occurs when a write enable signal that does not include low frequency beat noise is input to the PLL. B indicates the frequency characteristics of phase noise that occurs when a write enable signal that includes low frequency beat noise is input to the PLL.

In FIG. 9, phase noise at offset frequencies ranging from 10 to 100 KHz is improved in A than in B, and phase noise of an offset frequency of 1 KHz or lower, for example, is reduced. In B, phase noise degrades by as much as 40 dB or more due to low frequency spurious beat noise at offset frequencies around 18 Hz. In A, degradation of phase noise due to low frequency spurious beat noise at offset frequencies around 18 Hz is suppressed.

In the data frame generation circuit illustrated in FIG. 6, the frequency of the system clock is controlled such that the stored low order group PCM signal count in a frame $N_{frame}$ of the data frame falls outside the mean value range for the stored low order group PCM signal count in a frame $N_{frame}$ that may generate beat noise. Thus, the low order group PCM signals may be stored in each data frame such that low frequency beat noise does not occur.

Thus, in the data frame generation circuit illustrated in FIG. 6, occurrence of low frequency beat noise in data transmission that uses the optical transport network is suppressed. Since the occurrence of low frequency beat noise in the optical transport network is suppressed, clock signals may be reproduced with high purity without being affected by low frequency beat noise in the base station for the portable telephone system to which the data is transferred through the optical transport network.

In the data frame generation circuit illustrated in FIG. 6, the current setting and the potential modification setting for the stored low order group PCM signal count in a frame $N_{frame}$ switch in an alternating manner, and thus occurrence of low frequency beat noise may be suppressed. Thus, the operations of the frequency modification processing unit 25 may be simplified. In the data frame generation circuit illustrated in FIG. 6, since the mean value of the stored low order group PCM signal counts in frames $N_{frame}$ is used, the operations in the frequency control of the system clock may be stabilized in comparison to the case where the stored low order group PCM signal count in a frame $N_{frame}$ output on a data frame by data frame basis is used.

The data frame generation method illustrated in FIG. 4 may, for example, be implemented by the data frame generation circuit illustrated in FIG. 6. The data frame generation circuit illustrated in FIG. 6 may be applied to an optical transmission apparatus that is used, for example, in a digital wired transmission system.

Figure 10:
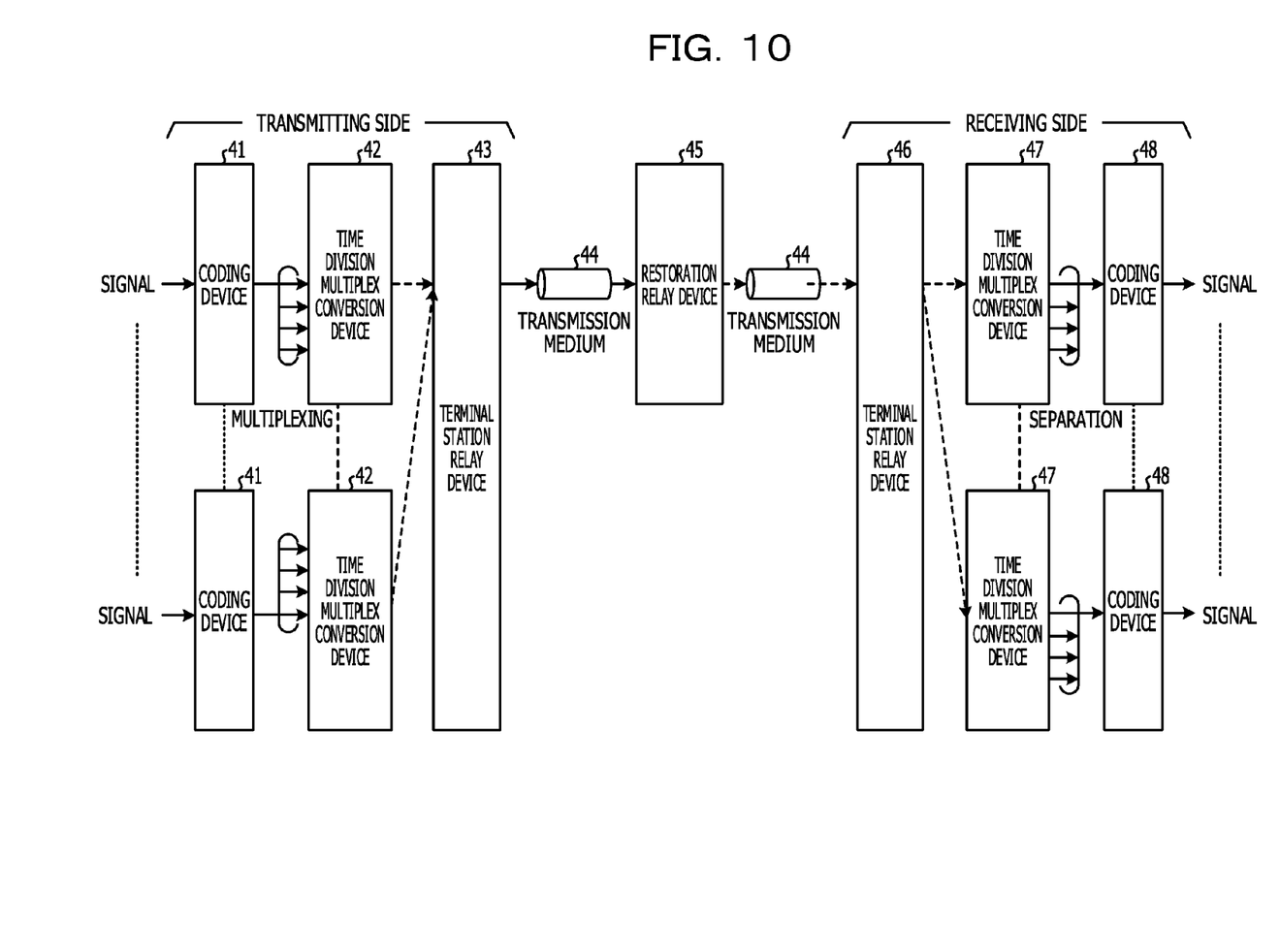
FIG. 10 illustrates an example of a digital wired transmission system.

FIG. 10 illustrates an example of a digital wired transmission system. As illustrated in FIG. 10, the digital wired transmission system includes a coding device 41, a time division multiplex conversion device 42, and a terminal station relay device 43 at a data transmitting side. A transmission medium 44 is coupled to the terminal station relay device 43. If the digital wired transmission system illustrated in FIG. 10 is an optical transmission system, the transmission medium 44 may, for example, be a transmission path such as an optical fiber cable.

At the data transmitting side, signals that are transmitted, for example, from a signal processing device provided at a preceding stage are converted from analog signals to digital signals by the coding device 41. The signals, which have been converted to digital signals, are multiplexed on a time axis by the time division multiplex conversion device 42. The multiplexed signals are converted to a signal that is compatible with the transmission medium 44 and sent to the transmission medium 44 by the terminal station relay device 43.

The digital wired transmission system includes a terminal station relay device 46, a time division multiplex conversion device 47, and a decoding device 48 at a data receiving side. At the data receiving side, the signal that has been transmitted through the transmission medium 44 is restored to the signals that are multiplexed on the time axis by the terminal station relay device 46. The multiplexed signals are separated into the original individual digital signals by the time division multiplex conversion device 47. The separated individual digital signals are converted to the original analog signals by the decoding device 48 and may be transmitted, for example, to a signal processing device provided at a following stage.

If the transmission distance by the transmission medium 44 is long, a restoration relay device 45 may be provided midway in the transmission medium 44. If the transmission distance is long, the waveform of the signal transmitted through the transmission medium 44 may degrade. The restoration relay device 45 restores the signal transmitted through the transmission medium 44 to a pulse signal that is substantially the same as a pulse signal output from the terminal station relay device 43 at the transmitting side and again transmits the restored signal to the transmission medium 44.

The data frame generation circuit illustrated in FIG. 6 generates data frames, for example, in accordance with the system clock that is restored in the restoration relay device 45 in accordance with the pulse signal output from the terminal station relay device 43 at the transmitting side. Thus, the data frame generation circuit illustrated in FIG. 6 may, for example, be applied to a circuit that restores a pulse signal that is substantially the same as the original pulse signal.

The data frame generation circuit illustrated in FIG. 1 or FIG. 6 may be applied to the OTN that is defined by the ITU-T recommendation G.709 or may be applied to an optical transport network other than the OTN or to a digital wired transport network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data frame generation circuit, comprising:
an input terminal configured to receive client signals;
a storage configured to store a signal count range; and
a processor configured to:
  generate a first data frame by storing the client signals from the input terminal in the first data frame in accordance with a system clock;
  output the first data frame including the client signals and a first signal count of the client signals included in the first data frame;
  compare the first signal count to a signal count range; and
  change a frequency of the system clock such that a second signal count of the client signals, which is included in a second data frame to be generated after generating the first data frame by storing the client signals from the input terminal in the second data frame in accordance with a changed system clock, is not within the signal count range when detecting that the first signal count falls within the signal count range,
wherein the processor is configured to set a first difference between the first signal count and the second signal count so that the first difference becomes greater than a second difference between an upper limit value and a lower limit value of the signal count range.

2. The data frame generation circuit according to claim 1, wherein a beat is generated within the signal count range.

3. The data frame generation circuit according to claim 1, wherein, when one of the first signal count and the second signal count fall within the signal count range, the processor is configured to change the frequency of the system clock to a frequency that corresponds to the other one of the first signal count and the second signal count.

4. The data frame generation circuit according to claim 1, further comprising:
a digital to analog converter configured to vary an output voltage thereof in accordance with the comparison result; and
a voltage controlled oscillator configured to vary an oscillation frequency thereof in accordance with the output voltage of the digital to analog converter.

5. The data frame generation circuit according to claim 4, wherein, when one of the first signal count and the second signal count of client signals included in the second data frame fall within the signal count range, the digital to analog converter varies the output voltage by an amount corresponding to a difference between a first frequency that corresponds to the first signal count and a second frequency that corresponds to the second signal count, and
wherein the voltage controlled oscillator varies the oscillation frequency by an amount corresponding to a change in the output voltage of the digital to analog converter.

6. The data frame generation circuit according to claim 1, wherein the processor is configured to compare a mean value of the first signal counts of the first data frames generated within a period to the signal count range.

7. A data frame generation method, comprising:
receiving client signals from an input terminal;
generating a first data frame by storing the client signals from the input terminal in the first data frame in accordance with a system clock;
outputting the first data frame and a first signal count of the client signals included in the first data frame;
comparing the first signal count with a signal count range stored in a memory;
changing a frequency of the system clock such that a second signal count of the client signals, which is included in a second data frame to be generated after generating the first data frame by storing the client signals from the input terminal in the second data frame in accordance with a changed system clock, is not within the signal count range when the first signal count falls within the signal count range; and
setting a first difference between the first signal count and the second signal count so that the first difference becomes greater than a second difference between an upper limit value and a lower limit value of the signal count range.

8. The data frame generation method according to claim 7, wherein a beat is generated within the signal count range.

9. The data frame generation method according to claim 7, further comprising:
changing, when one of the first signal count and the second signal count falls within the signal count range, the frequency of the system clock to a frequency that corresponds to the other one of the first signal count and the second signal count.

10. The data frame generation method according to claim 7, further comprising:
varying an output voltage of a digital to analog converter in accordance with the comparison result; and
varying the frequency of the system clock output from a voltage controlled oscillator in accordance with the output voltage of the digital to analog converter.

11. The data frame generation method according to claim 10,
wherein, when one of the first signal count and the second signal count of client signals included in the second data frame falls within the signal count range, the output voltage of the digital to analog converter is varied by an amount corresponding to a difference between a first frequency that corresponds to the first signal count and a second frequency that corresponds to the second signal count, and wherein the oscillation frequency of the voltage controlled oscillator is varied by an amount corresponding to a change in the output voltage of the digital to analog converter to modify the frequency of the system clock.

12. The data frame generation method according to claim 7, further comprising:

calculating a mean value of the first signal counts of the first data frames generated in a period; and comparing the mean value to the signal count range.

13. A data frame generation circuit, comprising:

a processor: and a storage configured to store a signal count range, wherein the processor is configured to:

output a first data frame including client signals and a first signal count of the client signals included in the first data frame, the client signals being stored in the first data frame in accordance with a system clock;

compare the first signal count to the signal count range;

control a frequency of the system clock based on a comparison result;

change a frequency of the system clock such that a second signal count of the client signals, which is included in a second data frame to be generated after generating the first data frame by storing the client signals in the second data frame in accordance with a changed system clock, is not within the signal count range when detecting that the first signal count falls within the signal count range; and set, when the first signal count falls within the signal count range, a first difference between the first signal count and the second signal count so that the first difference becomes greater than a second difference between an upper limit value and a lower limit value of the signal count range.

14. The data frame generation circuit according to claim 13, wherein a beat is generated within the signal count range.

15. The data frame generation circuit according to claim 13, wherein the processor compares a mean value of the first signal counts of the first data frames generated within a period to the signal count range.

* * * * *